US012490084B2

(12) United States Patent
Rademakers et al.

(10) Patent No.: US 12,490,084 B2
(45) Date of Patent: Dec. 2, 2025

(54) METHOD FOR CONTROLLING A COMMUNICATION BETWEEN A VEHICLE AND A BACKEND DEVICE

(71) Applicant: Volkswagen Aktiengesellschaft, Wolfsburg (DE)

(72) Inventors: Jan Rademakers, Barendrecht (NL); Caroline Pueschel-Bahrdt, Dannefeld (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 388 days.

(21) Appl. No.: 18/016,351

(22) PCT Filed: Jul. 9, 2021

(86) PCT No.: PCT/EP2021/069242
§ 371 (c)(1),
(2) Date: Jan. 15, 2023

(87) PCT Pub. No.: WO2022/013115
PCT Pub. Date: Jan. 20, 2022

(65) Prior Publication Data
US 2023/0292108 A1     Sep. 14, 2023

(30) Foreign Application Priority Data
Jul. 16, 2020   (EP) .................... 20186346

(51) Int. Cl.
*H04W 12/02*     (2009.01)
(52) U.S. Cl.
CPC ................... *H04W 12/02* (2013.01)

(58) Field of Classification Search
CPC ..................................... H04W 12/02
(Continued)

(56) References Cited

U.S. PATENT DOCUMENTS

| 7,228,211 | B1 * | 6/2007 | Lowrey | ................... | G07C 5/008 |
| | | | | | 701/32.4 |
| 9,325,650 | B2 | 4/2016 | Yalavarty et al. | | |

(Continued)

FOREIGN PATENT DOCUMENTS

| DE | 102015200422 A1 | 7/2015 |
| WO | 2018091328 A1 | 5/2018 |

OTHER PUBLICATIONS

PCT/EP2021/069242 International Search Report (Oct. 25, 2021).
EP20186346.1. Extended EP Search Report (Nov. 13, 2020).

*Primary Examiner* — Joel Ajayi
(74) *Attorney, Agent, or Firm* — Peter Zura; LOZA & LOZA, LLP

(57) ABSTRACT

Technologies and techniques for controlling communication between a vehicle and a backend device in a vehicle-to-cloud-system. A message may be sent from the vehicle to the backend device, and a timer is set for receiving an acknowledgment from the backend device at the vehicle that the message was successfully received. The message may be resent from the vehicle to the backend device when no acknowledgment from the backend device was received at the vehicle, or when an acknowledgment from the backend device does not correspond to the message sent from the vehicle to the backend device. Different schedules may be configured for receiving the acknowledgment and resending the message from the vehicle to the backend device, according to different settings.

21 Claims, 2 Drawing Sheets

(58) Field of Classification Search
USPC .......................................................... 455/411
See application file for complete search history.

(56) References Cited

U.S. PATENT DOCUMENTS

| | | | |
|---|---|---|---|
| 9,716,762 B2 | 7/2017 | Petersen et al. | |
| 10,607,485 B2 | 3/2020 | Gupta et al. | |
| 2004/0158373 A1* | 8/2004 | Nakaya | B60R 16/037 |
| | | | 701/49 |
| 2006/0193282 A1 | 8/2006 | Ikawa et al. | |
| 2015/0052619 A1* | 2/2015 | Kwak | G06F 21/6245 |
| | | | 726/28 |
| 2015/0207859 A1 | 7/2015 | Lu et al. | |
| 2016/0050609 A1* | 2/2016 | Erickson | H04W 48/18 |
| | | | 370/331 |

* cited by examiner

METHOD FOR CONTROLLING A COMMUNICATION BETWEEN A VEHICLE AND A BACKEND DEVICE

RELATED APPLICATIONS

The present application claims priority to International Patent App. No. PCT/EP202021/069242 to Rademakers et al., filed Jul. 9, 2021, titled "A Method For Controlling a Communication Between a Vehicle and a Backend Device" which further claims priority to European Pat. App. No. 20186346.1 filed Jul. 16, 2020, each the contents being incorporated by reference in their entirety herein.

TECHNICAL FIELD

Aspects of the present disclosure are related to technologies and techniques for controlling a communication between a vehicle and a backend device in a vehicle-to-cloud-system, especially from the vehicle side of the system. Some aspects of the present disclosure are related to an electronic control unit and/or a vehicle that includes a corresponding electronic control unit for controlling a communication between a vehicle and a backend device in a vehicle-to-cloud-system. Some aspects of the present disclosure are related to a computer program product for a corresponding method for controlling a communication between a vehicle and a backend device in a vehicle-to-cloud-system.

BACKGROUND

Vehicle-to-cloud-systems are basically known, for example from DE 10 2015 200 422 A1. Electronic control units in vehicles usually have computing units. However, these computing units are often limited in processing power and storage amount. Also, the access to programming updates or other data is sometimes combined with complications. On the other hand, cloud computers usually provide high computational power, large memory and easy access to updates as well as to other data. Vehicle-to-cloud-systems serves to provide cloud-computing applications in order to enhance vehicle functionalities for increased safety and intelligence as well as environmental and customer friendliness while adding to the comfortable and enjoyable operations. For this aim, electronic control units can send requests for certain applications to be provided within the cloud. Further, in the modern vehicle-to-cloud-systems a synchronization can be provided between the electronic control units and the cloud. However, known systems do not consider or treat the situations flexibly enough, when for example the communication between the vehicle and the cloud is not possible and/or not allowed.

SUMMARY

Aspects of the present disclosure are to provide technologies and techniques for controlling a communication between a vehicle and a backend device in a vehicle-to-cloud-system, especially from the vehicle side of the system, with improved, flexible functionality. In particular, a method for controlling a communication between a vehicle and a backend device in a vehicle-to-cloud-system is provided, which method enables to ensure that the messages from the vehicle to the backend device in the cloud were received, and which enables to provide flexible retry-mechanism for messages failed to be received by the backend device in the cloud. Some aspects of the present disclosure are directed to providing a corresponding electronic control unit for the vehicle, a corresponding vehicle and a related computer program product for the inventive method.

In some examples, a method is disclosed for controlling communication between a vehicle and a backend device in a vehicle-to-cloud-system, especially from the vehicle side of the system, as described in the claims below. In some examples, an electronic control unit is disclosed, including the features described in the claims below. In some examples a vehicle comprising a corresponding electronic control unit is disclosed, including features described in the claims below. Additionally, aspects of the present disclosure correspond to a vehicle-to-cloud-system. In some examples, a computer program product is disclosed for a corresponding method with the features included in the method steps. Details and features disclosed on individual aspects of the invention also apply to the other aspects of the present disclosure, and vice versa.

In some examples, a method is disclosed for controlling a (preferably wireless) communication (e.g., over a network, for example mobile phone network) between a vehicle and a backend device (on the cloud side of the system) in a vehicle-to-cloud-system, especially from the vehicle side of the system, preferably using a publish-subscribe environment such as MQTT protocol, the method comprising:
1) sending a message from the vehicle to the backend device,
2) setting a timer for receiving an acknowledgment from the backend device at the vehicle that the message was successfully received,
3) resending the message from the vehicle to the backend device, when no acknowledgment from the backend device was received at the vehicle or when an acknowledgment from the backend device does not correspond to the message sent in step 1), wherein the method steps 2) and 3) have different schedules according to different settings, especially purposeful and/or knowingly, preferably manually and/or automatically, determined, settings.

The method can be carried out in the given order or in a modified order. In some embodiments, the steps of the method according to the invention can be carried out simultaneously and/or repeatedly to allow a flowing process.

The different settings can be, for example, stored in a memory, preferably in a volatile memory, of an electronic control unit of the vehicle. The different settings can be preferably set, for example manually, by a user of the vehicle and/or automatically by an electronic control unit of the vehicle.

A backend device within the meaning of the present disclosure may be interpreted as a computer or a group of many computers providing a high computational power, a large memory and easy access to updates as well as to other data that can be used in the vehicle. The backend device within the meaning of the invention is the representative of the cloud.

The message from the vehicle to the backend device in step 1) can be associated with an application in the vehicle and comprise a special identification, so called ID. An application in the vehicle can include safety, intelligence, environmental and customer-setting, comfort and/or entertainment operations.

A timer set in step 2) may be configured to set a time to wait for receiving an acknowledgment from the backend device at the vehicle that the message was successfully received. If no acknowledgment has been received by the vehicle within the time period defined by the timer, or if an acknowledgment has an incorrect ID, a retry mechanism is provided in step 3). The timer determines the time of waiting for an acknowledgment from the backend device. The acknowledgment can also be called confirmation of receipt. The acknowledgment can also comprise computing results and/or other information (publish received, publish release or publish complete and so on for certain applications, if requested in the message).

In step 3) the messages may be resent for which no acknowledgment or no acknowledgment with a matching ID was received from the cloud.

The schedules in the meaning of the present disclosure can also be referred to as "schemata". The schedules can include any details about the workflow of the method steps, like for example, durations of the steps, number of discrete items within the steps, repeat numbers of the steps and so on.

In some examples, an electronic control unit is disclosed, comprising: a memory, in which a program code is stored, and a computing unit, wherein when carrying out the program code by the computing unit, method steps as disclosed herein are performed. With the help of the electronic control unit, similar advantages can be achieved as with the help of the methods described herein. Full reference is made to these advantages in the present disclosure.

In some examples, a vehicle is disclosed comprising a corresponding electronic control unit performing the functions described herein. With the help of the inventive vehicle, similar advantages can be achieved as with the help of the method described herein. Full reference is made to these advantages in the present disclosure.

Some aspects of the present disclosure may be directed to a corresponding vehicle-to-cloud-system.

In some examples, a computer program product is disclosed, comprising a program code for carrying out method steps as described herein. The computer program product comprises instructions which, when the program is executed by a computer, cause the computer to carry out embodiments of the method described herein. With the help of the computer program product, similar advantages can be achieved as with the help of the methods described herein. Full reference is made to these advantages in the present disclosure.

BRIEF DESCRIPTION OF THE DRAWINGS

Aspects of the present disclosure and further developments as well as advantages will be explained in more detail below using figures. The figures schematically show.

DETAILED DESCRIPTION

Figure 1:
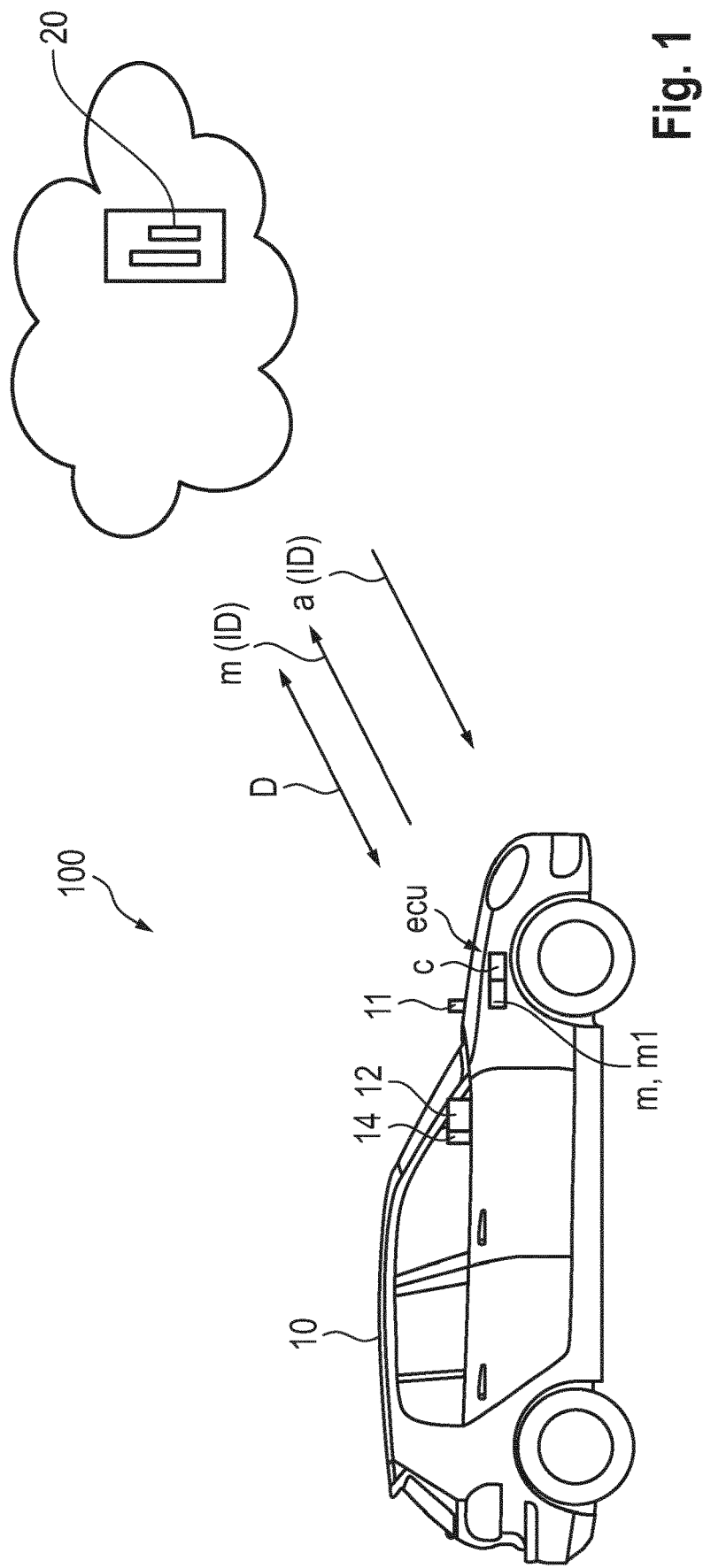
FIG. 1 shows a schematic design of a vehicle-to-cloud-system according to some aspects of the present disclosure.

Various aspects disclosed herein are directed to providing flexible acknowledgement schemata and/or adaptive retry-mechanism for different settings (in the following also simply referred to as "settings"). In some examples, messages are sent (e.g., including updates and/or data about certain applications) with a certain ID to the cloud and waiting for an acknowledgement message on the same ID. In case the ID is different, or no acknowledge message has been received, the last known version of the message will be sent again. This mechanism can have unlimited retries for poor connections, as long as the user accepted the synchronization with the cloud. The settings can be, in one example, low level of privacy, wherein an electronic control unit is online. But in case the user has requested not to share information, and not to synchronize with the cloud, the mechanism will be adapted. For example, the vehicle can than only retry once in step 3), for example after the timer of 30 seconds of no response in step 2). After this, a communication unit of the vehicle can be switched off, thus the electronic control unit can be switched offline. The settings can be chosen by the user of the vehicle. Also, the settings can be provided automatically, for example with respect to the current position of the vehicle, according to the user calendar data, according to the environment of the vehicle and so on. In this case a possibility can be given to the user to confirm and/or to adapt the settings.

In some examples, after the execution of the method using different configured settings, the communication unit of the vehicle can be switched off, in that the electronic control unit of the vehicle can be switched offline. Also, an application associated with the message can also be stopped.

Thus, the privacy setting of the user, the environment of the vehicle and/or authorization level of the user can be considered in a preferable way due to flexibly acknowledgement schemata and/or flexible retry-mechanisms according to aspects of the present disclosure.

In some examples, the different settings may include privacy settings. In this way, the preferences of the user concerning his or her privacy can be taken into account in an advantageous way, especially by the communication and/or synchronization with the cloud. Thus, user data can be treated confidentially.

In some examples, the different settings, such as privacy settings, may include one or more of the following levels of privacy:
low level of privacy, wherein at low level of privacy, a communication unit of the vehicle for the communication with the backend device is switched on (e.g., an electronic control unit of the vehicle is online),
reduced level of privacy,
increased level of privacy, and/or
high level of privacy, wherein at high level of privacy a communication unit of the vehicle for the communication with the backend device is switched off (e.g., an electronic control unit of the vehicle is offline).

In such a way flexible consideration of different privacy levels can be achieved.

In some examples, the different settings are determined, e g manually, by a user of the vehicle, especially by operating an input device, preferably a display device on a vehicle dashboard, of the vehicle. Thus, the user's preferences can be taken into account directly.

In some examples, the different settings are determined automatically by an electronic control unit of the vehicle, especially with respect to current position of the vehicle, according to user calendar data, according to user authorization level (for example by shared vehicles), according to environment of the vehicle (for example airport zone, highway, city and so on) and so on. Thus, environment factors and/or authorization factors can be taken into account by the communication with the backend device (that is the cloud) in an advantageous way.

In some examples, a confirmation and/or adjustment possibility of the automatically determined settings is provided for an user of the vehicle, especially by operating an input device, for example, a display device at a vehicle dashboard, of the vehicle. Thus, a detection and review function of the different settings automatically determined by the electronic control unit can be provided to the user.

In some examples, on or before the step 1), a verification is carried out if sending is allowed according to the different settings, and/or, in or before the step 1), a verification is carried out if sending is possible, wherein especially a communication test to the backend device is carried out. Therefore, the different, configured settings can be taken into account in a safe and reliable manner.

In some examples, the timer in step 2) has different durations according to the different settings. Thus, the different settings can have effect on how long the vehicle wait for an acknowledgement of the message in step 2).

In some examples, a duration of the timer in step 2) may be dependent on a level of privacy of the different settings. In this way the level of privacy can be considered in a corresponding way in step 2).

Further, a duration of the timer in step 2) may be configured to be decreasing, with increasing level of privacy of the different settings. In this way, the preference of privacy can be quickly considered. For example, a duration of the timer according to a high level of privacy of the different settings may be 0.1 second to 1 minute, especially 1 second to 30 seconds, preferably 30 seconds, and/or a duration of the timer according to a low level of privacy of the different settings may be 1 minute to 10 minutes, especially 1 minute to 5 minutes, preferably 5 minutes.

In some examples, the resending of the message in step 3) may be configured with a different number of attempts according to the different settings. Thus, the different settings can have an effect on how often the vehicle retries to resend the message in step 3).

In some examples, a number of attempts can be dependent on the level of privacy of the different settings. In this way, the level of privacy can be considered in a corresponding way in step 3).

Additionally, it is conceivable that a number of attempts can increase with increasing levels of privacy of the different settings. Thus, when the user's preference is to stay "offline", more attempts to resend the message can be quickly performed in order to ensure that the cloud receives the information that it needs and to ensure that the electronic control unit can be switched offline relatively fast. In other words, only one try to resend the message should be as successful as possible before the electronic control unit will be switched offline. For example, a number of attempts according to a high level of privacy of the different settings can be 2 to 10, especially 4 to 8, preferably 6, and/or a number of attempts according to a low level of privacy of the different settings can be 1 to 10, especially 2 to 8, preferably 4.

In some examples, a configured number of repetitions may be carried out in accordance with the applicable different settings. In this case, a number of repetitions may be dependent on a level of privacy of the different settings, especially a number of repetitions may be decreasing with increasing level of privacy of the different settings. For example, a number of repetitions according to a high level of privacy of the different settings may comprise only one repetition. A number of repetitions according to a low level of privacy of the different settings may comprise at least one repetition or any necessary number of repetitions if needed.

FIG. 1 shows a vehicle-to-cloud-system 100. The vehicle-to-cloud-system 100 comprises at least one vehicle 10 and a backend device 20 within the cloud. The vehicle 10 may include an electronic control unit ecu. To increase the functionality of the vehicle 10 the backend device 20 can provide one or more of high computational power, large memory and easy access to updates as well as to other data. Thus, cloud-computing applications may enhance vehicle functionalities, for example for more safety, intelligence, environmental and customer-friendly and comfortable operations as well as enjoyable operations. For this purpose, the electronic control unit ecu may send one or more requests for certain applications to be provided by the backend device 20. Also, a synchronization can be provided between the electronic control unit ecu and the backend device 20.

Figure 2:
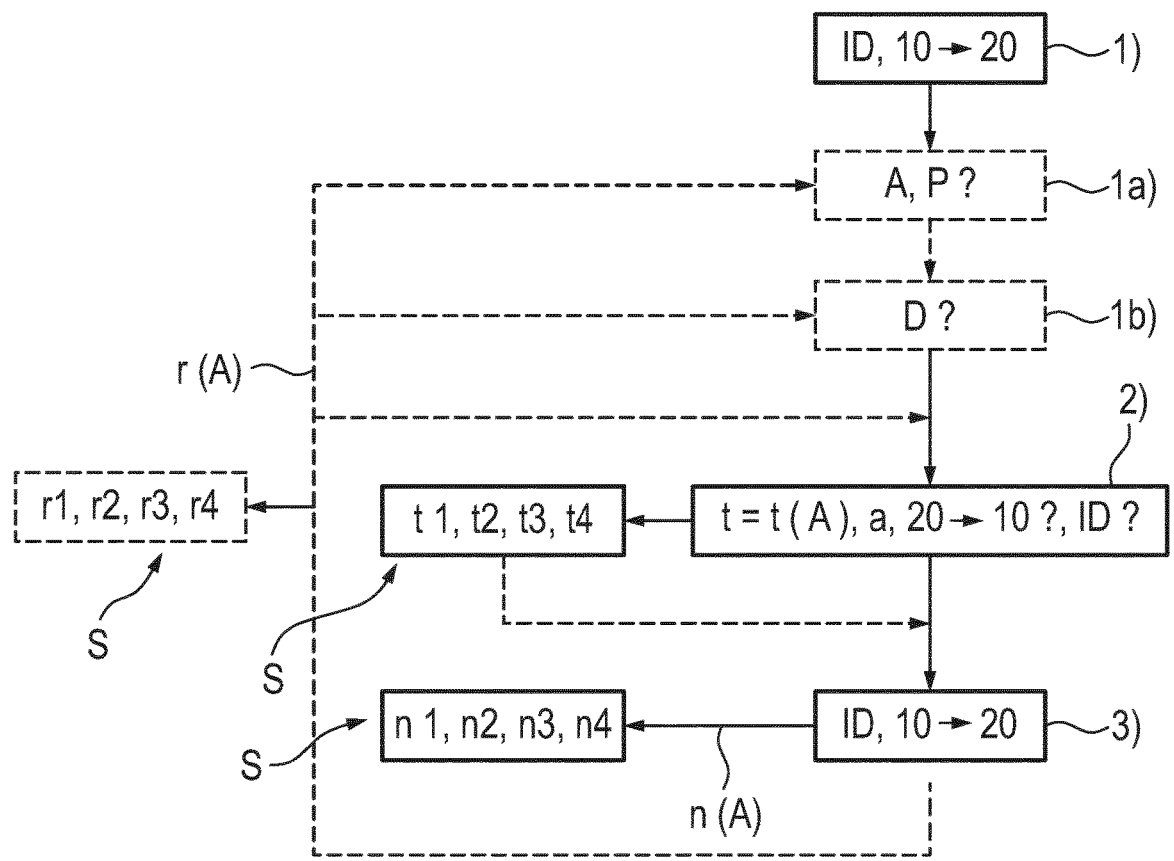
FIG. 2 shows a schematic flow diagram of a method according to some aspects of the present disclosure.

FIG. 2 illustrates a method for controlling a communication D between the vehicle 10 and the backend device 20 in the vehicle-to-cloud-system 100 schematically showed in FIG. 1, especially from the vehicle side of the system 100. The method comprises the following steps:
1) sending a message m from the vehicle 10 to the backend device 20, wherein the message can be characterized by a certain identification ID and be associated with an application in the vehicle 10,
2) setting a timer t for receiving an acknowledgment a from the backend device 20 at the vehicle 10 that the message m was successfully received, e.g. the timer t sets a maximum time period to wait for receipt of the acknowledgment,
3) resending the message m from the vehicle 10 to the backend device 20, when no acknowledgment a from the backend device 20 was received at the vehicle 10 by the time or within the time period set by timer t or when an acknowledgment a was received by the time or within the time period set by timer t from the backend device 20, but has an incorrect identification ID, The method steps 2) and 3) may be configured to have different schedules S according to different settings, especially purposeful and/or knowingly, preferably manually and/or automatically, determined, settings A.

The different settings A can be, for example, stored in a memory m of an electronic control unit ecu of the vehicle 10. The memory m may be a volatile memory m1. The different settings A may be set by a user of the vehicle 10, e.g., manually, and/or automatically by an electronic control unit ecu of the vehicle 10.

A backend device 20 can include at least one computer or a group of multiple computers within the cloud.

Applications provided by the backend device 20 for the vehicle 10 can include safety, intelligence, environmental and customer-setting, comfort and/or entertainment operations.

A timer t (time to wait) set in step 2) serves to establish a time or time period for receiving an acknowledgment a from the backend device 20 at the vehicle 10 that the message m was successfully received. If no acknowledgment a was received by the vehicle by the time set by the timer or within the time period set by the timer, or when an acknowledgment received by the time set by the timer or within the time period set by the timer has an incorrect ID, a retry mechanism to resend the message m is provided in step 3). The acknowledgment a can also comprise confirmation of receipt of the message m and/or computing results for an application, if requested in the message m.

In step 3) the message m for which no acknowledgment a or no acknowledgment with a matching ID was received from the backend device 20 will be resent according to a special resend mechanism according to the determined settings A.

In some examples, the schedules S can include any details about the workflow of the method steps 2) and 3), like for example, durations of the timer t, number n of attempts to resend the message m and/or number r of repetitions of the steps 2) and 3).

The present disclosure provides a flexible acknowledgement schemata in step 2) and/or adaptive retry-mechanism in step 3) for different settings A. In step 1) the message m including updates and/or data about certain applications with a certain ID may be sent to the cloud. In step 2) the vehicle 10, especially the electronic control unit ECU of the vehicle 10, may wait for an acknowledgement a on the same ID. In case the ID is different or no acknowledgement a has been received, the last known version of the message m will be sent again in step 3).

After the execution of the method according to the different settings A, including configured settings, the communication unit 11 of the vehicle 10 may be switched off, e.g., the electronic control unit ECU of the vehicle may be switched offline. An associated application may then be stopped.

As shown in FIG. 2, the different settings A may include privacy settings P. In other words, the different settings A may include one or more of the following levels Ai of privacy:

low level A1 of privacy, wherein at low level A1 of privacy, a communication unit 11 of the vehicle 10 for the communication D with the backend device 20 is switched on in that an electronic control unit ECU of the vehicle 10 is online, reduced level A2 of privacy, wherein for example some confidential data is not allowed to be shared with the backend device 20, increased level A3 of privacy, wherein for example some confidential data and/or some user data is not allowed to be shared with the backend device 20, and/or high level A4 of privacy, wherein at high level A4 of privacy a communication unit 11 of the vehicle 10 for the communication D with the backend device 20 is switched off in that an electronic control unit of the vehicle is offline.

The different settings A may be determined by a user of the vehicle 10, e.g., manually. For this purpose, an input device 14, preferably a display device at a vehicle dashboard 12, of the vehicle 10 may be provided.

In some examples, the different settings A are determined automatically by an electronic control unit ECU of the vehicle 10. In such case, the electronic control unit ECU may for example consider one or more parameters selected from the parameters including a current position of the vehicle 10, user calendar data, user authorization level (for example by shared vehicles 10), and environment of the vehicle 10 (for example airport zone, highway, city and so on). Of course, also other useful information may be considered by the electronic control unit ecu for this purpose. Additionally, a confirmation and/or adjustment possibility of the automatically determined settings A may be provided for a user of the vehicle 10, for example by operating an input device 14, such as a display device at a vehicle dashboard 12, of the vehicle 10.

As shown in FIG. 2, on or before the step 1) a verification 1a) may be carried out if sending is allowed according to the different settings A. Also, on or before the step 1), a verification 1b) may be carried out if sending is possible, wherein especially a communication test to the backend device 20 may be carried out.

As FIG. 2 schematically indicates, the timer tin step 2) may have different durations t1, t2, t3, t4 for different settings A. Preferably, a duration t1, t2, t3, t4 of the timer tin step 2) may be dependent on a level Ai of privacy of the different settings A. For example, a duration t1, t2, t3, t4 of the timer tin step 2) may be decreasing with increasing level Ai of privacy of the different settings A. Especially a duration t4 of the timer t according to a high level A4 of privacy of the different settings A may be 30 seconds, wherein a duration t1 of the timer t according to a low level A1 of privacy of the different settings A may be 5 minutes.

As FIG. 2 further indicates, the resending the message m in step 3) has different maximum number n1, n2, n3, n4 of attempts according to the different settings A. A number n of attempts may be preferably dependent on a level Ai of privacy of the different settings A. For example, a number n of attempts may increase with increasing level Ai of privacy of the different settings A. Especially a number n4 of attempts according to a high level A4 of privacy of the different settings A may be 6, wherein a number n1 of attempts according to a low level A1 of privacy of the different settings A may be 4.

Also, the same number n of attempts according to the different settings A may be set for more simplicity.

As FIG. 2 further indicates, the steps 1a) and/or 1b), 2) and 3) may be carried out a certain number r of repetitions according to the different settings A. In this case, a number r of repetitions of the steps 1a) and/or 1b), 2) and 3) may depend on a level Ai of privacy of the different settings A, especially a number r of repetitions of the steps 1a) and/or 1b), 2) and 3) may be decreasing with increasing level Ai of privacy of the different settings A. For example, a number r4 of repetitions according to a high level A4 of privacy of the different settings A may comprise only one repetition of steps 1a) and/or 1b), 2) and 3), wherein a number r1 of repetitions according to a low level A1 of privacy of the different settings A may comprise any necessary number r of repetitions of steps 1a) and/or 1b), 2) and 3).

An electronic control unit ECU includes a memory m, in which a program code is stored, and a computing unit c, wherein when carrying out the program code by the computing unit c, a method as described above, e.g., with reference to FIG. 2, may be performed. In other words, the electronic control unit ecu may be configured to execute the method as described above.

The vehicle 10 may comprise the above-described electronic control unit ECU.

The method described above, e.g., the embodiment depicted in FIG. 2, may be carried out by a computer program product. That is, the computer program product may comprise instructions which, when the program is executed by a computer, cause the computer to carry out embodiments of the method described above.

The above description of the figures describes the present invention only in the context of examples. Of course, individual features of the embodiments can be combined with each other, provided it is technically reasonable, without leaving the scope of the invention.

REFERENCE SIGNS 100 vehicle-to-cloud-system
10 vehicle
11 communication unit
12 vehicle dashboard
14 input device
20 backend
A settings
Ai level of privacy
A1 low level A2 reduced level
A3 increased level
A4 high level
P privacy settings
S schedules
m message
a acknowledgment
ID Identification of an application
ecu electronic control unit
c computing unit
m memory
m1 volatile memory
t timer
t1 duration of the timer according to low level of privacy
t2 duration of the timer according to reduced level of privacy
t3 duration of the timer according to increased level of privacy
t4 duration of the timer according to high level of privacy
n number of attempts
n1 number of attempts according to low level of privacy
n2 number of attempts according to reduced level of privacy
n3 number of attempts according to increased level of privacy
n4 number of attempts according to high level of privacy
r number of repetitions
r1 number of repetitions according to low level of privacy
r2 number of repetitions according to reduced level of privacy
r3 number of repetitions according to increased level of privacy
r4 number of repetitions according to high level of privacy

The invention claimed is:

1. A method for controlling communication between a vehicle and a backend device in a vehicle-to-cloud-system, comprising:
sending a message from an electronic control unit (ECU) of the vehicle to the backend device;
setting a timer via the ECU for receiving an acknowledgment from the backend device at the vehicle that the message was successfully received; and
resending the message via the ECU from the vehicle to the backend device, when an acknowledgment from the backend device does not correspond to the sent message,
wherein setting the timer and resending the message via the ECU are configured with different schedules dynamically determined according to different privacy settings of the vehicle, wherein the different privacy settings are determined based on user input via a user interface or automatically based on vehicle context comprising one or more of a current position of the vehicle, a user calendar, a user authorization level, and an environment of the vehicle.

2. The method according to claim 1, further comprising verifying, prior to the sending of the message, at least one of (i) whether sending is allowed according to the different privacy settings or (ii) whether sending is possible based on a communication test with the backend device.

3. The method according to claim 2, wherein the different privacy settings comprise one or more of
a low level of privacy, wherein at the low level of privacy, a communication unit of the vehicle is switched on,
a reduced level of privacy,
an increased level of privacy, and/or
a high level of privacy, wherein at the high level of privacy, the communication unit of the vehicle is switched off.

4. The method according to claim 1, wherein the different settings are determined by an input device of the vehicle.

5. The method according to claim 1, wherein the different settings are determined automatically by an electronic control unit (ECU) of the vehicle.

6. The method according to claim 5, further comprising providing a confirmation and/or adjustment possibility of the automatically determined settings.

7. The method according to claim 1, further comprising at least one of:
verifying if sending is allowed according to the different settings, prior to the sending of the message, and/or
verifying if sending is allowed according to a communication test, prior to the sending of the message.

8. The method according to claim 1, wherein setting the timer comprises setting the timer to different durations according to the different settings.

9. The method according to claim 8, wherein the different durations are dependent on one or more of
a level of privacy of the different settings, and/or
a duration decreasing with increasing level of privacy of the different settings.

10. The method according to claim 1, wherein the resending of the message comprises resending the message using a different number of attempts according to the different settings.

11. The method according to claim 10, wherein the different number of attempts are dependent on one or more of
a level of privacy of the different settings, and/or
a different number of attempts that are increasing, with increasing level of privacy of the different settings.

12. The method according to claim 1, wherein the setting the timer and resending the message from the vehicle to the backend devices are repeated for a configured number of repetitions according to the different settings.

13. The method according to claim 12, wherein the configured number of repetitions is dependent on one or more of
a level of privacy of the different settings, and/or
a decreasing number of repetitions with increasing level of privacy of the different settings.

14. An electronic control unit (ECU) of a vehicle, comprising:
communications circuitry for communicating over a network with a backend device;
a memory; and
a processor, operatively coupled to the memory wherein the processor is configured to
send, via the communications circuitry, a message from the vehicle to the network;
set a timer for receiving an acknowledgment from the backend device at the vehicle that the message was successfully received; and
resend the message from the vehicle to the backend device, when an acknowledgment from the backend device does not correspond to the sent message,
wherein the processor is configured to set the timer and resend the message with different schedules dynamically determined according to different privacy settings of the vehicle, wherein the different privacy settings are determined based on user input via a user interface or automatically based on vehicle context comprising one or more of a current position of the vehicle, a user calendar, a user authorization level, and an environment of the vehicle.

15. The ECU according to claim 13, further comprising verifying, prior to the sending of the message, at least one of (i) whether sending is allowed according to the different privacy settings or (ii) whether sending is possible based on a communication test with the backend device.

16. The ECU according to claim 14, wherein the different privacy settings comprise one or more of
- a low level of privacy, wherein at the low level of privacy, a communication unit of the vehicle is switched on,
- a reduced level of privacy,
- an increased level of privacy, and/or
- a high level of privacy, wherein at the high level of privacy, the communication unit of the vehicle is switched off.

17. The ECU according to claim 13, wherein the processor is configured to set the timer by setting the timer to different durations according to the different settings.

18. The ECU according to claim 16, wherein the different durations are dependent on one or more of
- a level of privacy of the different settings, and/or
- a duration decreasing with increasing level of privacy of the different settings.

19. The ECU according to claim 1, wherein the resending of the message comprises resending the message using a different number of attempts according to the different settings.

20. The ECU according to claim 18, wherein the different number of attempts are dependent on one or more of
- a level of privacy of the different settings, and/or
- a different number of attempts that are increasing, with increasing level of privacy of the different settings.

21. A vehicle, comprising:
- communications circuitry for communicating over a network with a backend device;
- a memory; and
- an electronic control unit (ECU), operatively coupled to the memory, wherein the ECU is configured to
  - send, via the communications circuitry, a message from the vehicle to the network;
  - set a timer for receiving an acknowledgment from the backend device at the vehicle that the message was successfully received; and
  - resend, via the communications circuitry, the message from the vehicle to the backend device, when an acknowledgment from the backend device does not correspond to the sent message,
- wherein the ECU is configured to set the timer and resend the message with different schedules dynamically determined according to different privacy settings of the vehicle, wherein the different privacy settings are determined based on user input via a user interface or automatically based on vehicle context comprising one or more of a current position of the vehicle, a user calendar, a user authorization level, and an environment of the vehicle.

\* \* \* \* \*